UNITED STATES PATENT OFFICE.

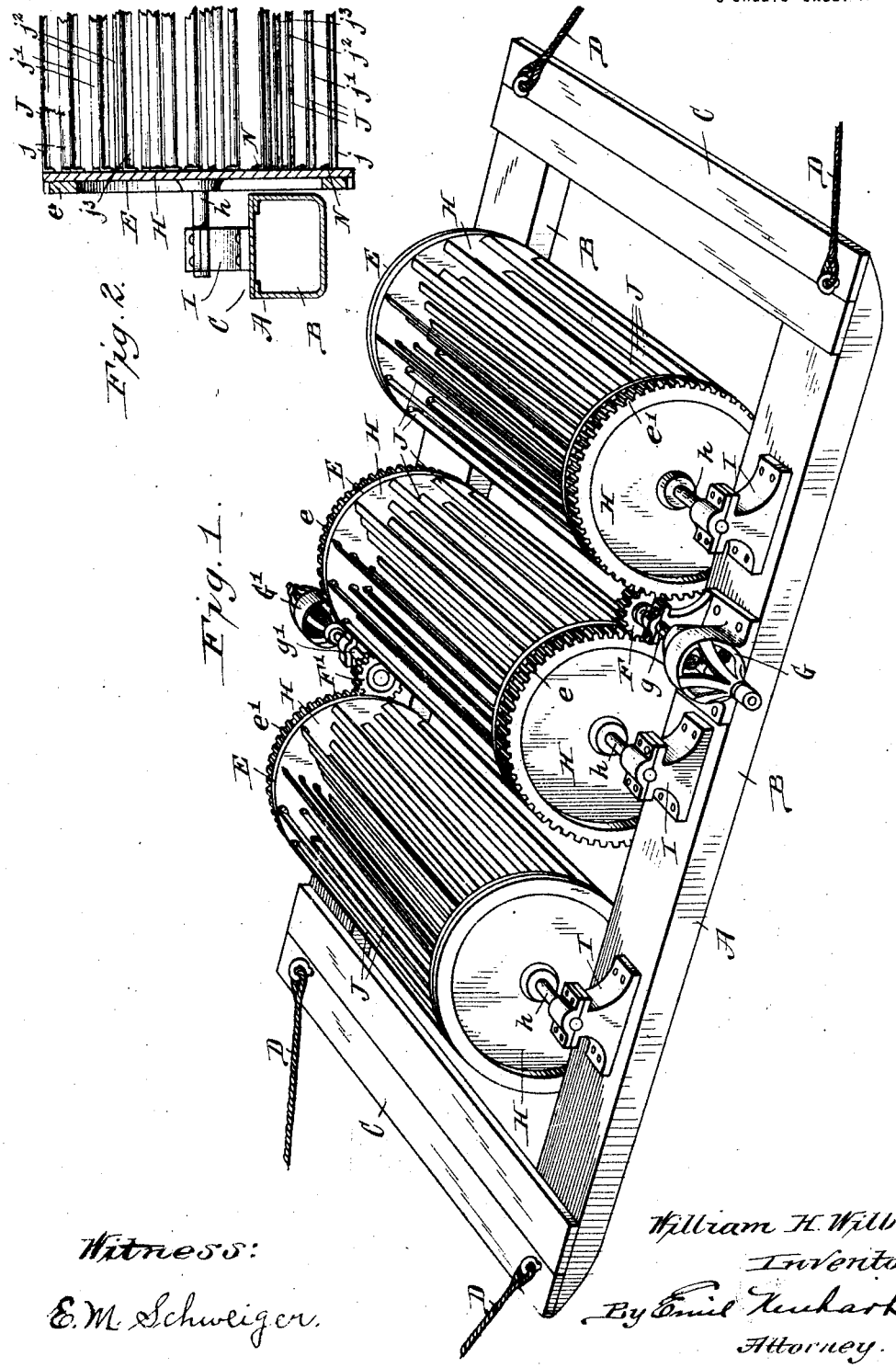

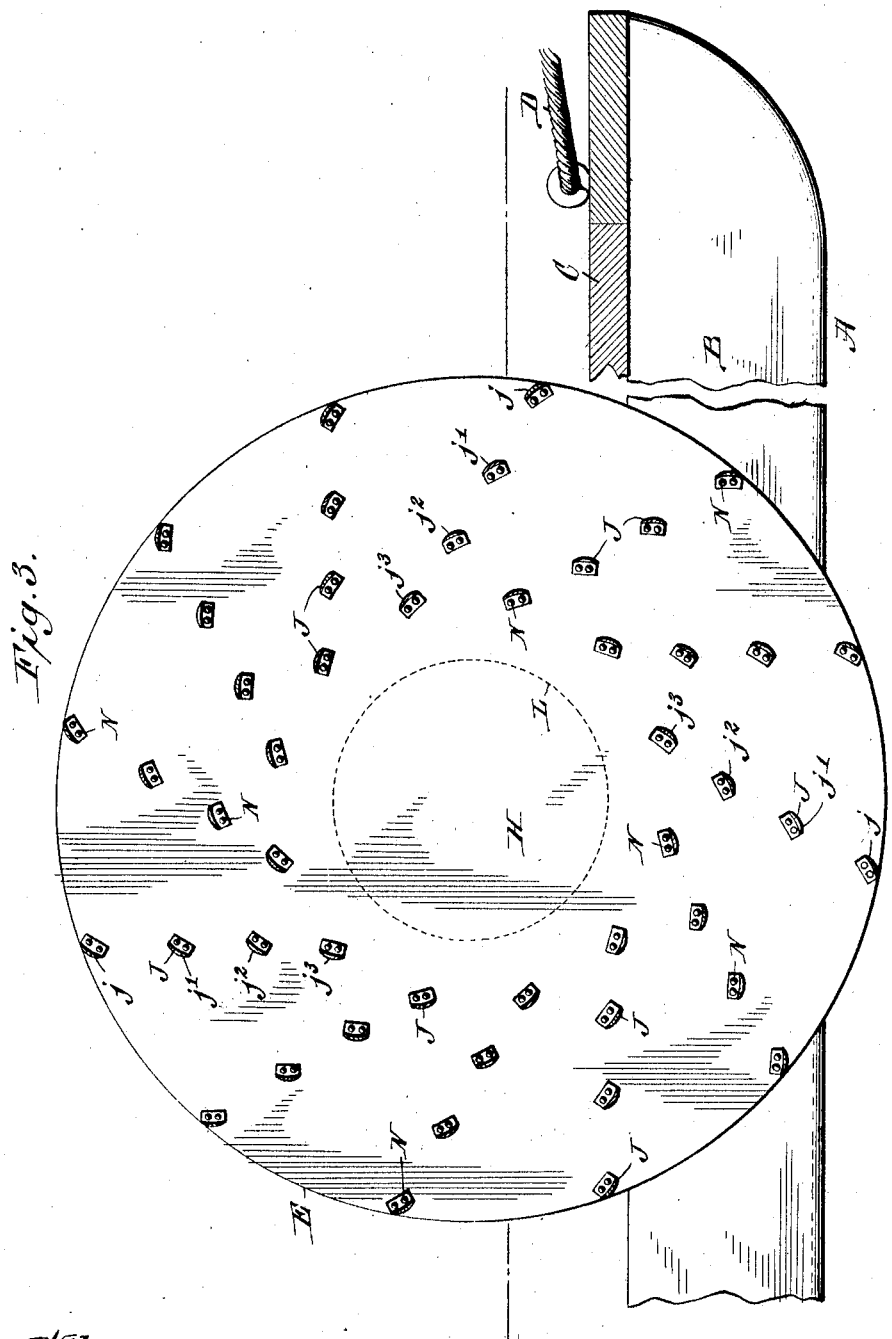

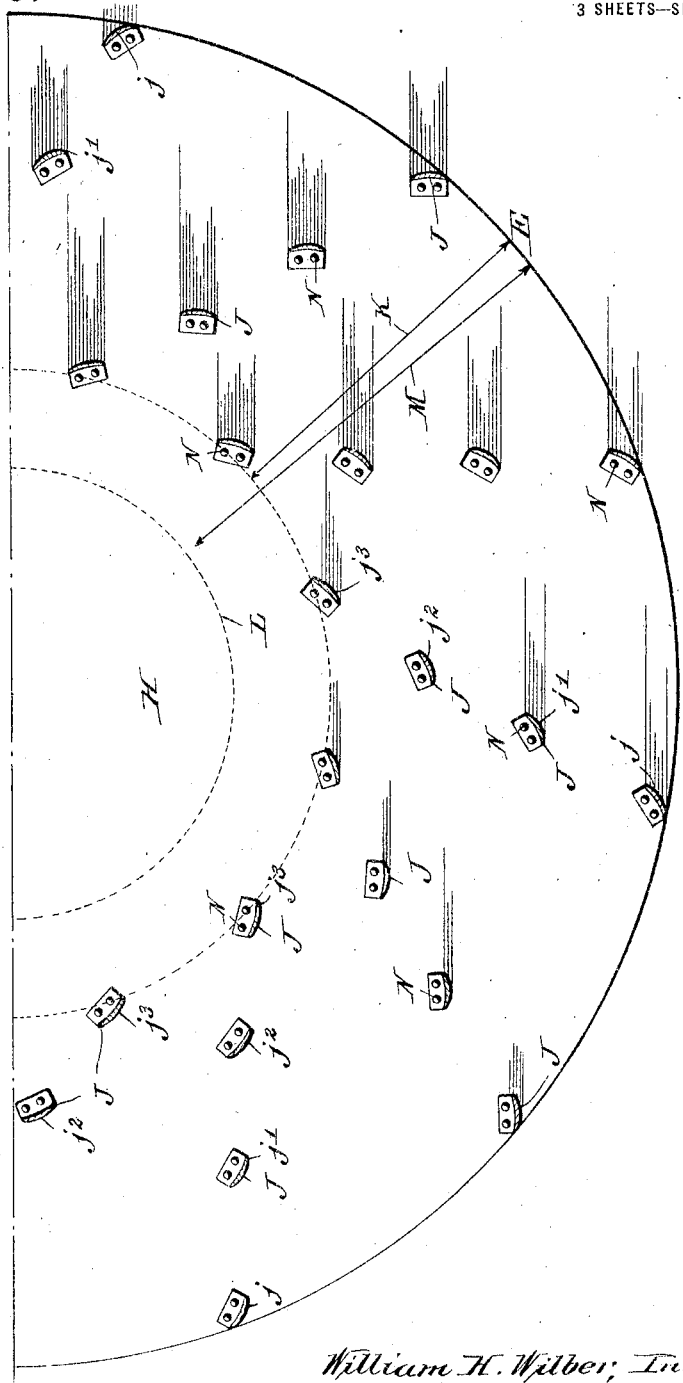

WILLIAM H. WILBER, OF BUFFALO, NEW YORK.

WATER-POWER APPARATUS.

1,338,890.  Specification of Letters Patent.  Patented May 4, 1920.

Application filed November 20, 1917. Serial No. 202,900.

*To all whom it may concern:*

Be it known that I, WILLIAM H. WILBER, a citizen of the United States, residing at Buffalo, in the county of Erie and State of New York, have invented certain new and useful Improvements in Water-Power Apparatus, of which the following is a specification.

My invention relates to a water power apparatus including a novel water wheel or motor provided with impact or contact blades against which the current water of a stream or other flowing body of water is adapted to act to rotate the wheel or motor.

One of the objects of my invention is the provision of a water wheel or motor of simple construction having a plurality of series or circuits of impact or contact blades so arranged that the radial measurement of the annular space in which they are placed is considerably less than the combined cross sectional area of the contact faces of said blades against which the flowing water simultaneously acts.

Another object of my invention is the provision of a water wheel or motor provided with impact blades arranged in a number of circular series or circuits and having each blade of each series or circuit in line, or approximately in line, with a blade of each of the remaining series or circuits, thereby forming sets of blades with each set including one blade of each series or circuit.

A further object of my invention is to provide a water wheel or motor having a plurality of series or circuits of blades with the blades of adjoining series or circuits spaced apart so that the flowing body of water traveling in a horizontal, or substantially horizontal, plane comes in contact with the blades at different points in the revolution of the wheel without obstruction being offered by other blades of the wheel or motor.

Another object of my invention is to construct a water wheel or motor provided with spaced blades arranged in lines extending inwardly from the periphery of the wheel or motor with the distance between the outer edge of the outermost blade and the inner edge of the innermost blade less than the combined transverse measurement of the blades presented simultaneously in unobstructed manner to the flowing stream of water.

A further object of my invention is to provide a water wheel or motor with a plurality of series of blades so arranged that the blades of all the series are disposed in lines or sets extending from the periphery of the wheel or motor and enter and leave the water in succession, the blade of the outermost series in each line or set entering and also leaving the water first, the blades in the second or adjacent series entering and leaving second, and the blades in the remaining series thus continuing in order of succession, the number of series being limitless within certain radial dimensions to which a wheel of this type can be practically constructed.

Another object is the placement of the blades so that each blade obstructs only a fractional part of a cubic foot of water in the depth of the operating portion of the water.

A still further object is to provide a water wheel of this type in which the placement and arrangement of the blades is such that horizontal water channels are provided through the wheel or motor, each of said channels being approximately three times the width of each blade, and through which channels the water flows without damming or slowing up of the current water.

A still further object is to so construct a water wheel or motor that resistance to the rotation of the wheel is reduced to the minimum; that the current water acts against the blades at different points in the revolution of the same without pocketing the water between them; and that the flowing water after having exerted its force against a blade passes from the latter without being dammed or perceptibly slowed up so that it is free to act on any other blade in advance that may be in its course.

With these and other objects in view, the invention consists in a water wheel or motor having a plurality of annular series or circuits of blades, the blades of each series or circuit being spaced from those of an adjoining series or circuit, or from adjoining series or circuits.

It further consists in a water wheel having a plurality of series or circuits of blades so arranged that the combined total obstruction of said blades to the flowing water is greater than the radial distance of the annular space in which said series or circuits of blades are arranged.

It further consists in a water wheel or motor having blades spaced apart from its periphery inward and also annularly so that the flowing water may pass through the lower portion of the wheel or motor and so that it acts against all submerged blades of the wheel or motor.

It further consists in the novel arrangement of parts and in the construction, arrangement and combination of devices, elements and parts to be hereinafter described and more particularly pointed out in the subjoined claims.

In the drawings,—

Figure 1 is a perspective view of a power apparatus embodying my invention.

Fig. 2 is a fragmentary cross section of the apparatus extending only through a portion of the length of the water wheel or motor.

Fig. 3 is an enlarged longitudinal section through one end of the apparatus.

Fig. 4 is a cross section through the lower half of one of the water wheels or motors, showing the impact water; the comparative lengths of the radial measurement of the annular space in which the blades are arranged and the measurement of the total obstructing surfaces presented by said blades.

Referring now to the drawings in detail, A represents a buoyant frame which may be constructed in any practicable manner. By preference, it comprises two hollow longitudinal air-filled tanks or floats B which are spaced apart a distance somewhat greater than the length of each of the water wheels or motors to be carried thereby, these tanks or floats being connected at opposite ends by cross members C secured to the upper faces of said tanks or floats.

At each end the buoyant frame is anchored by means of cables D, or other similar anchoring elements. The carrying capacity of this frame is of course in accordance with the number and size of the water wheels carried thereby. Disposed transversely within said frame is a plurality of water wheels or motors E constructed in a manner to be hereinafter described in detail. It may, however, be here stated that these water wheels are substantially of cylindrical outline, and at each end the intermediate wheel or motor is provided with a gear rim $e$, while the outer or end wheels or motors are each provided with a gear rim $e^1$ at one of its ends, the gear rim $e^1$ of the two outer or end wheels or motors being at opposite sides of the apparatus and being in line, respectively, with the gear rims $e$ of the intermediate wheel or motor at the same side of the apparatus.

Between the gear rim $e$ of the intermediate wheel or motor at one end thereof and the gear rim $e^1$ at the same end of one of the end wheels or motors, a pinion F is disposed which is in mesh with both of said gear rims, and which is secured to a shaft $g$ forming part of a dynamo or electric generator G. Between the other gear rim $e$ of the intermediate wheel or motor, and the gear rim $e^1$ of the other end wheel or motor at the same side of the apparatus, a pinion $F^1$ is disposed and meshes with said two last-mentioned gear rims. Said pinion $F^1$ is secured to a shaft $g^1$ forming part of a dynamo or electric generator $G^1$.

The dynamos or generators G, $G^1$ are secured to the floats or tanks B, as clearly shown in Fig. 1, and current may be delivered therefrom for driving motors, or otherwise utilizing the power imparted to the water wheels or motors and converted into electric power by said dynamos or generators. It is of course understood that any practicable arrangement whereby the motion of the water wheels or motors and the power thereof may be imparted may be substituted for the arrangement herein shown and described.

In preferred form each of the water wheels or motors comprises two end heads H to the outer faces of which the hereinbefore-mentioned gear rims $e$ or $e^1$ are secured. Projecting axially from each of these heads is a stub shaft $h$ which may be formed on or fastened to said head in any suitable manner, these shafts being journaled in suitable bearings formed in standards I secured to the opposite floats or tanks B and so spaced on each of said floats or tanks that the water wheels or motors are spaced apart, as clearly shown in Fig. 1.

Each water wheel or motor has its heads H connected together by means of blades J against which the flowing stream or body of water is adapted to act, these blades being arranged in a plurality of annular or circular series or circuits and having the blades of the successive series or circuits arranged in lines or sets extending from the periphery inwardly and being designated by the characters $j$, $j^1$, $j^2$, $j^3$. It is, of course, understood that in some cases only two or three annular series or circuits of blades may be employed, while in others more than four may be employed, as my invention is capable of variation in this respect to the use of any number of series or circuits of blades within the practical limits of a wheel, but I have found by experimenting that three annular series or circuits of blades will give greatest efficiency, as such an arrangement provides greater clearance between blades for the flowing water and presents a greater number of blades simultaneously to the flowing water.

The blades are arranged within an annular space having the radial distance indicated by the line K, Fig. 4, and the blades of the several series are arranged in lines, or substantially so, from their periphery inwardly, preferably on a tangent to a circle, for instance L, within the innermost series of said blades. The blades of each series or circuit are separated a greater distance in the successive series from the inner series outwardly and they are arranged in certain annular regions which are spaced apart diminishing distances from the periphery inward. I term the spaces between the blades of each set "horizontal channels," since they allow the water to flow horizontally between such blades and allow such water to contact with any blades in advance that may be in the same horizontal plane. I find that the best results are obtained by making the combined widths of the channels between the blades of each set of a size so that they are three times, or approximately three times, the combined width of such blades; in other words, the combined widths of the blades of each set (each set including one blade of each series or circuit of blades) is approximately one-fourth the length of the tangentially-arranged planes in which said blades are fixed. In this manner, during the rotation of the wheel, the blades of the successive series arranged in a line extending inwardly from their periphery, or in other words, the blades of each set enter the water in succession, and also leave the water in the same order of succession, therefore greatly assisting in reducing the resistance offered by the blades when entering or leaving the water.

The blades J are curved and have their convex surfaces facing outwardly so that the flowing water will come in contact with the said surfaces, those of the several annular series or circuits being arranged at slightly different angles to a line tangential to the periphery of the wheel with a view of presenting the convex impact or contact surfaces thereof to the flowing water so as to obtain the greatest power at the most effective portion of the revolution of the wheel, and also with a view of causing the blades to enter the water and also leave the same edgewise so as to reduce the resistance of the blades in the water to the minimum. This enables the flowing water to impart practically its full power to those blades that present their impact or contact surfaces to the water and should happen to be in a horizontal plane in which no other blade in rear or, as it may be termed, no other approaching blade is located.

The combined or total obstruction offered initially and simultaneously by the various blades to the flowing water is greater in measurement transversely of the blades than the radial measurement of the space in which the blades are located; in other words, the surfaces of the blades engaged simultaneously by the water to propel the wheel or motor, if arranged in a straight line, would have a combined transverse measurement greater than a single blade extending from the periphery inwardly to the inner edge of the blades constituting the innermost series or circuit; consequently, in an ordinary form of water wheel having blades extending inwardly from the periphery and presenting unbroken or continuous surfaces, each blade, in order to present the same superficial area to the flowing water as applicant's blades, would have to reach inwardly a distance beyond the inner edges of the blades of the innermost series or circuit as indicated by the line M in Fig. 4, with the disadvantage of one blade obstructing or damming up the water in its action against the wheel, in addition to offering such marked resistance in entering the water and passing out of the same as to cause considerable of the power applied to the blade to be lost. The blades of applicant's improved water wheel or motor may be of any desired length, and at their ends they are riveted or otherwise secured to the opposite heads of the wheel or motor, as at N.

Considerably more than one-fourth of the blades of the complete number included in the annular series or circuits for the flowing water are brought in contact therewith without any portion of such contacting water having first been in contact with a blade or blades in rear thereof, and this I term the initial impact of the flowing water. As the blades continue in their annular course they will be engaged by portions of the flowing water which had been previously in contact with other blades of the wheel and been deflected by such blades so as to pass on through the channels between the blades, the water coming in contact with the blades a second time and the water so deflected and coming into contact with blades a second time, I term "secondary impact."

I might here state, that while the total obstruction offered initially by the various blades to the water is represented by the line M in Fig. 4, it will be quite apparent upon examination of said figure, that additional obstruction is offered by the blades to water after the latter has spent its initial force, and that such water also acts against the blades on its passage through the wheel or motor. The combined or total obstruction offered initially and secondarily by the various blades therefore equals or exceeds in measurement transversely of the blades the depth of that portion of the water that the wheel or motor operates in.

My invention is susceptible to various changes in relative arrangement and placement of parts, of relative measurements of parts and of various other minor changes without departing from the spirit of the invention or sacrificing any of the advantages thereof, the particular arrangement of parts shown and described being now considered the preferable and most effective, but it is clear that such parts are merely illustrative of the principle involved and therefore capable of being variously modified while fully within the scope of the appended claims.

Having thus described my invention, what I claim is:—

1. A water wheel or motor having a plurality of series or circuits of blades so arranged that the radial measurement of the annular space in which they are placed is less than the combined transverse measurement of the contact faces of said blades against which the flowing water acts, the blades of different series or circuits being disposed in different radial planes so that they enter and leave the water in succession.

2. A water wheel or motor having a plurality of series or circuits of blades arranged with the blades of adjoining series or circuits spaced apart, the spaces between said series or circuits being wider than the blades spaced thereby, so that a flowing body of water traveling in a horizontal, or substantially horizontal, plane comes in contact with the blades at different points in the revolution of the wheel or motor without obstruction being offered by other blades of the wheel or motor.

3. A water wheel or motor having blades disposed in sets extending inwardly from the periphery of the wheel or motor in tangential or substantially tangential arrangement, each of the blades being disposed obliquely to radial lines passing therethrough so that they enter and leave the water edgewise, or approximately so, thereby offering very little resistance to the rotation of the wheel or motor.

4. A water wheel or motor having a plurality of circular series of blades, the blades of adjoining series being separated by annular spaces of greater width than said blades so that each blade obstructs only a fractional part of a cubic foot of water in the depth of the operating water.

5. A water wheel or motor having a plurality of blades spaced apart around the wheel or motor and also from the periphery thereof inwardly with no two blades wholly in the same radial plane so that the flowing water has initial impact against said blades at different points in the revolution of the same.

6. A water wheel or motor having a plurality of series or circuits of blades arranged in tangentially or substantially tangentially disposed sets, the blades of each set being so spaced and arranged that their combined total obstruction to the flowing water is greater than the radial measurement of the space of the water wheel or motor in which said blades are arranged.

7. A water wheel or motor having a plurality of blades so disposed relatively that horizontal water channels are provided which are considerably wider than said blades and through which channels the water flows and thus prevents the damming or slowing up of the current water.

8. A water wheel or motor provided with a plurality of blades arranged in tangentially or substantially tangentially disposed sets, the blades of each set being arranged to form free water passages regardless of the circumferential position of the wheel or motor so that the water has initial effect on a plurality of said blades simultaneously.

9. A water wheel or motor arranged horizontally and adapted to have its lower portion submerged in a flowing stream or body of water, said wheel or motor having blades spaced apart along tangential lines so that the flowing stream of water has initial effect or action against the blades in several tangential lines during the rotation of said wheel or motor.

10. A water wheel or motor having a plurality of blades arranged in tangentially or substantially tangentially disposed sets with the blades of each set separated by spaces wider than the blades, so that flowing water may pass through said motor to exert its power initially and simultaneously against said blades at different points around the same.

11. A water wheel or motor having a plurality of circular series of blades arranged in tangentially or substantially tangentially disposed sets having the blades of each set spaced apart with the spaces between the blades wider than each of the blades spaced thereby so that horizontal channels for water three times or approximately three times the width of said blades are provided, thus allowing the water to flow through the wheel or motor and prevent damming or slowing up of the current water.

12. A water wheel or motor having a plurality of circular series or circuits of concavo-convex blades with the convex surfaces thereof presented up-stream for impact of the flowing water thereagainst.

13. A water wheel or motor having a plurality of circular series or circuits of curved blades with the curvature of each of the series or circuits of blades slightly different with respect to a radial line passing through the axis of said wheel or motor.

14. A power apparatus comprising a plurality of water wheels or motors arranged one in front of another, each water wheel or motor having a plurality of blades spaced apart around the wheel and also from the periphery thereof inwardly, said blades being arranged in sets extending in tangential or substantially tangential lines with the blades of each set spaced apart and the space between adjoining blades wider than each of said blades to permit water to pass between the blades without slowing up the speed of the same and to permit the water to act with practically the same force against the succeeding water wheel or motor.

15. A power apparatus comprising a frame and a plurality of water wheels or motors arranged transversely and mounted for rotation on said frame, each wheel having a plurality of circular series or circuits of blades with the blades of all series or circuits arranged in sets extending inwardly from the periphery of the wheel or motor, the blades of each set being spaced apart and so that the flowing water has initial effect or action against several sets of blades during the revolution of the motor and passes through the spaces between said blades without perceptible loss of speed so as to impart its force in like manner to the succeeding wheel or motor.

16. A water wheel or motor having a plurality of blades spaced around the wheel and also inwardly from its periphery, the blades of a portion of said wheel or motor greater than a quadrant thereof being exposed simultaneously to initial impact of the flowing water.

17. A water wheel or motor having a plurality of circular series or circuits of blades with the blades of each series or circuits spaced apart and the blades of the several circuits spaced from each other, said blades being arranged in sets disposed in a line tangential to a circle smaller than the circle in which the inner or innermost series or circuits of blades are disposed.

18. A water wheel or motor having one-half thereof, or approximately so, within a flowing body of water and the other half above the water and having a plurality of sets of spaced blades arranged on tangential lines and so disposed and spaced that the water has initial impact against the majority of the submerged blades.

In testimony whereof I affix my signature.

WILLIAM H. WILBER.